July 2, 1968 E. G. BENSON ET AL 3,391,291
ELECTRIC MOTOR CONSTRUCTION
Filed Aug. 6, 1965
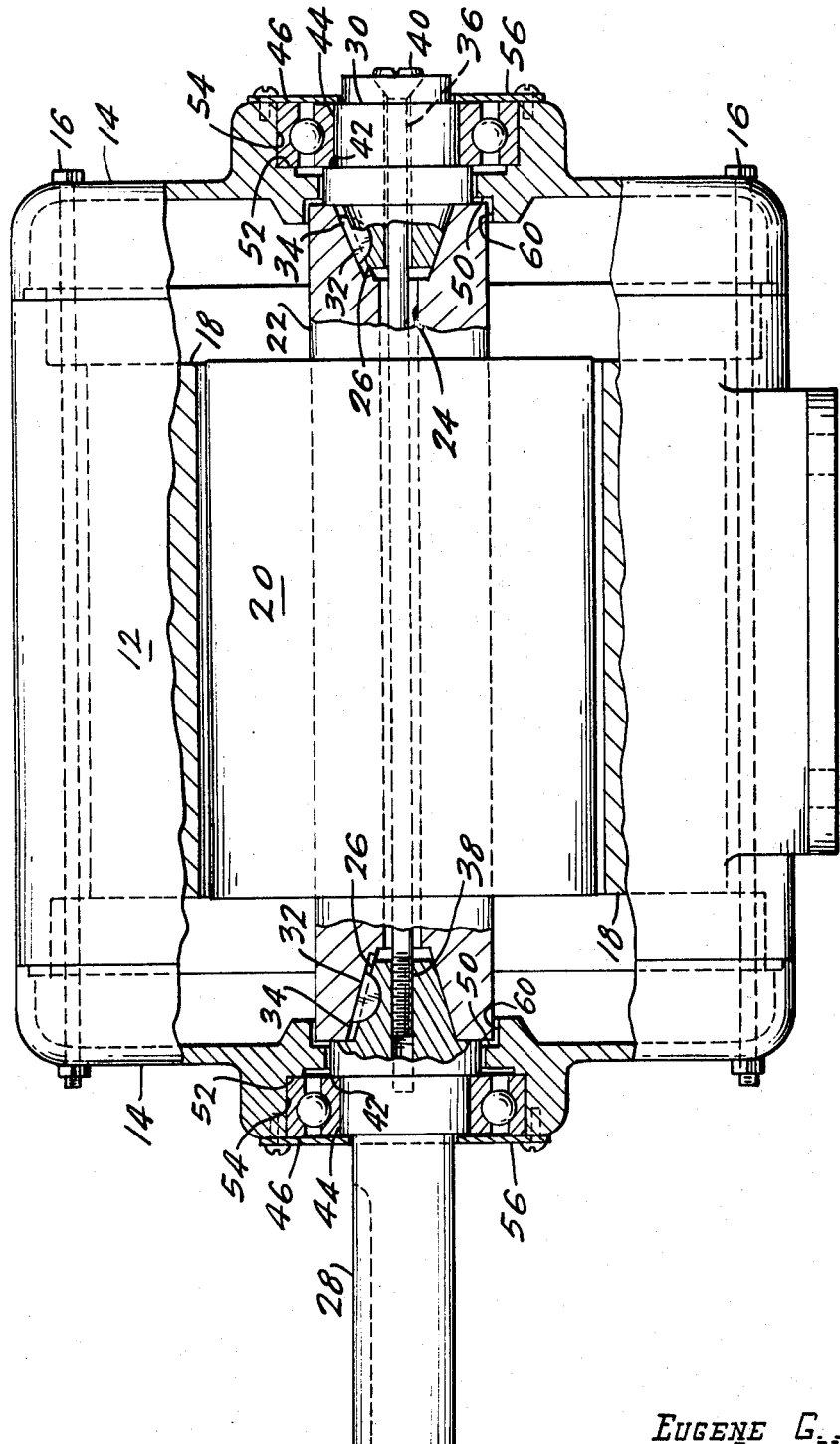
INVENTORS:
EUGENE G. BENSON,
BY JOHN W. O'NEIL
ATT'YS.

United States Patent Office 3,391,291
Patented July 2, 1968

3,391,291
ELECTRIC MOTOR CONSTRUCTION
Eugene G. Benson, R.D. 5, and John W. O'Neil, 201 E., Market St., both of Cadiz, Ohio 43907
Filed Aug. 6, 1965, Ser. No. 477,876
3 Claims. (Cl. 310—90)

The present invention relates to electric motors; and more particularly to the structure by which the rotor of the motor is supported from the frame.

Practically every piece of manufacturing equipment that is built today is powered by its own electric motor. Every industrial plant, therefore, uses a large number of electric motors, many of which are the same size and horsepower. Electric motors of any given size and horsepower can be purchased with either right-hand or left-hand shaft extensions or both to facilitate the mounting and coupling to the machinery which it drives.

Electric motors have been perfected to the degree wherein substantially the only source of failure is bearing failure. Accepted practice of the day is to keep at least one motor of every size and type used in an industrial plant as a spare for replacing a motor which has failed. The bearings used in motors usually last a number of years even when in continuous service so that the warehousing of a large number of sizes and types of replacement motors in an industrial plant is a sizeable problem.

An object of the present invention is the provision of a new and improved construction of electric motor which will permit one motor of any given size to suffice for all applications regardless of the shaft extension required.

Another object of the present invention is the provision of a new and improved electric motor which will permit the bearings to be replaced while the motor is mounted in position on the driven machinery.

The invention resides in certain constructions and combinations and arrangements of parts, and further objects and advantages of the invention will become apparent to those skilled in the art to which it relates from the following description of the preferred embodiment described with reference to the accompanying drawing forming a part of this specification, and in which: the solitary figure is a cross-sectional view through an electric motor embodying the present invention.

The electric motor shown in the drawing is somewhat schematic in that all of the parts are not shown and others are shown in a simplified form. In general the motor comprises a housing 10 of generally conventional construction comprising a center section 12 and two end caps or end bells 14. The end bells are held to the center section by means of through bolts 16. Inside of the housing so formed, is the usual field cores and windings 18 which provide the necessary magnetic coupling with the rotor 20.

The rotor 20 is of conventional construction excepting that its shaft 22 is generally tubular in shape and has an axially extending opening 24 therethrough. The shaft 22 is slightly shorter than is the housing 10, and the opposite ends of the shaft opening 24 are tapered as at 26 for providing a firm attachment to oppositely extending stub shafts 28 and 30. While it may not be necessary in every instance, the stub shafts are preferably keyed to the shaft 22. In the embodiment shown in the drawing, this is accomplished by means of a conventional Woodruff Key 32 carried by the stub shafts and which project into key ways 34 formed in the sidewalls of the tapers 26. The stub shaft 30 has an axially extending opening 36 therethrough, while the inner end of the stub shaft 28 is provided with an axially extending threaded opening 38. A threaded rod 40 is inserted through the opening 36 and screwed into the opening 38 to hold the assembly of the shafts 22, 28 and 30 together.

Each of the stub shafts 28 and 30 are stepped so as to provide an outwardly facing shoulder 42 with a cylindrical support surface 44 outwardly thereof. The portions of the stub shafts outwardly of the support surfaces 44 must have a diameter no larger than the support surface 44. In the preferred arrangement, the portion of the stub shafts outwardly of the support surface 44 is of a reduced diameter to facilitate the removal of shaft support bearings 46. The shaft support bearings 46 may be of any suitable type, and in the embodiment shown in the drawing, are anti-friction ball bearings.

The end bells 14 of the electric motor are each provided with an axially extending opening 50, through which the stub shafts project. The outer ends of the openings 50 provide support surfaces for the anti-friction bearings 46 and include an outwardly facing abutment surface 52 to limit inward movement of the bearings. Bearing support surfaces 54 are provided outwardly of the abutment surfaces 52, and the regions outwardly of the bearing support surfaces 54 must be free and clear or at least be of a diameter at least equal to the bearing support surfaces 54 to facilitate removal of the anti-friction bearings 46. The bearing support surfaces 44 and 54 are of diameters providing press fits with respect to an anti-friction bearing 46 of predetermined size and the bearings are pressed into engagement with the abutment surfaces 42 and 52, and are held in place by annular retaining rings 56. Suitable dirt seals not shown, can also be provided for sealing off the anti-friction bearings.

The bearings 46 can be easily removed by loosening the threaded rod 40 and by thereafter tapping the head of the rod 40 with a hammer to free the stub shaft 28 from the taper 26. The tapping of the rod 40 will at the same time force the anti-friction bearing 46 outwardly of the support surface 54. Thereafter the rod 40 can be removed, and the stub shaft 28 taken out of the annular shaft 22. The opening 24 through the annular shaft 22 is slightly larger in diameter than is the opening through the stub shaft 30, and the stub shaft 30 can be removed by inserting a rod through the opening 24 until it engages the inner surface of the stub shaft 30. Thereafter a sharp blow causes the end of the annular shaft 22 to abut the end bell 14, and the stub shaft 30 to be removed from the taper 26. The rod can then drive the anti-friction bearing 46 outwardly of its supporting surface 54. During this movement it will be seen that the bearing on either end of the motor can be quickly replaced without disconnecting the electrical connections to the motor, and without removing large portions of the driven machinery.

In some instances, the clearance between the rotor 20 and the surrounding field mechanism 18 may be appreciable so that removal of the stub shafts 28 and 30 would, if additional means were not provided, allow the rotor 20 to drop down in the housing 10. In the preferred embodiment shown in the drawing, a support surface 60 is provided in each end bell just beneath the end of the annular shaft 22, so that the ends of the shaft 22 can rest on the supporting surface 60 when the stub shafts are removed. In the embodiment shown in the drawing, the supporting surfaces are formed by means of an annular shoulder that is an integral part of the end bells 14. The shoulders 60, therefore, hold the rotor in approximate position until the stub shafts 28 and 30 are again installed, at which time movement of the stub shafts into the conical surfaces 26 will lift the shaft 22 free and clear of the supporting surfaces 60.

It will further be seen that the positions of the stub shafts 28 and 30 can be reversed to provide a motor of opposite hand drive. In addition, it will also be seen that stub shafts of any projecting length can be easily installed. A single frame and rotor, therefore, of any size can be used to replace any other motor of the same size by installation of the stub shafts removed from the motor which the spare motor is to replace.

While the invention has been described in considerable detail, we do not wish to be limited to the particular embodiment shown and described, and it is our intention to cover all novel adaptations, modifications and arrangements thereof which come within the practice of those skilled in the art to which the invention relates.

What we claim is:

1. An electric motor comprising: a stationary frame, a rotor having a generally tubular shaft in said frame, said shaft having an axially extending opening therethrough with outwardly facing conically tapered sidewalls at opposite ends of said opening, said frame having openings therein aligned with said shaft, said frame openings having outwardly facing shoulders, stub shafts extending through said frame openings and having tapered ends received in said tapered sidewalls of said opening in said shaft, one of said stub shafts having an axially extending opening therethrough and the other of said stub shafts having an axially extending threaded opening communicating with its inner end, annular bearings fitted in said frame openings in engagement with said shoulders and supporting said stub shafts from said frame, shoulder means on at least one of said stub shafts for engagement with the inner face of its annular supporting bearing, and a rod extending through the opening in said one of said stub shafts and threaded into the opening on the other of said stub shafts for holding said shafts together.

2. An electric motor comprising: a stationary frame, a rotor having a generally tubular shaft in said frame, said shaft having an axially extending opening therethrough with outwardly facing conically tapered sidewalls at opposite ends of said opening, said frame having openings therein aligned with said shaft, said frame openings having outwardly facing shoulders, stub shafts extending through said frame openings and having tapered ends received in said tapered sidewalls of said opening in said shaft, one of said stub shafts having an axially extending opening therethrough and the other of said stub shafts having an axially extending threaded opening communicating with its inner end, annular bearings fitted in said frame openings in engagement with said shoulders and supporting said stub shafts from said frame, said stub shafts being of reduced diameter outwardly of said bearings, shoulder means on said stub shafts for engagement with the inner faces of said annular supporting bearings, and a rod extending through the opening in said one of said stub shafts and threaded into the opening in the other of said stub shafts for holding said shafts together.

3. An electric motor comprising: a stationary frame, a rotor having a generally tubular shaft in said frame, said shaft having an axially extending opening therethrough with outwardly facing conically tapered sidewalls at opposite ends of said opening, said frame having openings therein aligned with said shaft, said frame openings having outwardly facing shoulders, stub shafts extending through said frame openings and having tapered ends received in said tapered sidewalls of said opening in said shaft, one of said stub shafts having an axially extending opening therethrough and the other of said stub shafts having an axially extending threaded opening communicating with its inner end, annular bearings fitted in said frame openings in engagement with said shoulders and supporting said stub shafts from said frame, shoulder means on at least one of said stub shafts for engagement with the inner face of its annular supporting bearing, said housing having a shaft support surface at each end and positioned a predetermined distance beneath said generally tubular shaft when supported by said bearings for supporting said generally tubular shaft when said stub shafts are removed, and a rod extending through the opening in said one of said stub shafts and threaded into the opening in the other of said stub shafts for holding said shafts together.

References Cited

UNITED STATES PATENTS

| | | | |
|---|---|---|---|
| 1,918,690 | 7/1933 | Engelhardt | 310—90 |
| 2,769,934 | 11/1956 | Stone et al. | 310—90 |
| 3,013,167 | 12/1961 | Bobula | 310—90 |
| 3,161,794 | 12/1964 | Lindgren | 310—89 |
| 3,256,451 | 6/1966 | Shipman | 310—90 |

MILTON O. HIRSHFIELD, *Primary Examiner.*

L. L. SMITH, *Assistant Examiner.*